(12) United States Patent
Moulhaud et al.

(10) Patent No.: US 9,229,994 B2
(45) Date of Patent: Jan. 5, 2016

(54) SERVER-SIDE TRACING OF REQUESTS (75) Inventors: Patrick Moulhaud, Seattle, WA (US);
Daron Spektor, Seattle, WA (US);
Federico Emmanuel Gomez Suarez,
Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 13/285,476

(22) Filed: Oct. 31, 2011

(65) Prior Publication Data

US 2013/0111011 A1 May 2, 2013

(51) Int. Cl.
*G06F 15/16* (2006.01)
*G06F 17/30* (2006.01)
*H04L 29/08* (2006.01)
*G06F 11/34* (2006.01)
*H04L 12/26* (2006.01)

(52) U.S. Cl.
CPC ...... *G06F 17/30563* (2013.01); *G06F 11/3476* (2013.01); *G06F 11/3495* (2013.01); *G06F 17/3089* (2013.01); *H04L 67/22* (2013.01); *G06F 2201/875* (2013.01); *H04L 43/14* (2013.01)

(58) Field of Classification Search
CPC ............ G06F 11/3476; G06F 11/3495; G06F 11/3438; G06F 2201/875; H04L 43/10
USPC ........................................................ 709/224
See application file for complete search history.

(56) References Cited

U.S. PATENT DOCUMENTS

| 7,398,434 | B2 | 7/2008 | Auvenshine et al. | |
|---|---|---|---|---|
| 7,640,459 | B2 | 12/2009 | Ivanov et al. | |
| 7,761,387 | B2 * | 7/2010 | Bjerre et al. | 705/333 |
| 7,954,011 | B2 | 5/2011 | Ivanov et al. | |
| 8,271,645 | B2 * | 9/2012 | Rajan et al. | 709/224 |
| 2002/0046281 | A1 * | 4/2002 | Cope | 709/227 |
| 2005/0276388 | A1 * | 12/2005 | Ethier et al. | 379/32.05 |
| 2008/0155348 | A1 | 6/2008 | Ivanov et al. | |
| 2008/0168169 | A1 * | 7/2008 | Cope | 709/224 |

(Continued)

OTHER PUBLICATIONS

"Dapper, a Large-Scale Distributed Systems Tracing Infrastructure"—Sigelman et al, Google, Apr. 2010 http://static.googleusercontent.com/media/research.google.com/en//archive/papers/dapper-2010-1.pdf.*

(Continued)

*Primary Examiner* — Randy Scott
(74) *Attorney, Agent, or Firm* — Julie Kane Akhter; Danielle Johnston-Holmes; Micky Minhas (57) ABSTRACT

One or more techniques and/or systems are provided for selective server-side tracing of user requests that match tracing criteria. For example, internal server processing data and/or a server-side perspective of web traffic data associated with a server processing a user request may be generated server-side as tracing data. The tracing data may be utilized in troubleshooting issues that may arise between a client machine and the server (e.g., error in uploading a photo to a website hosted by the server). Because a web-based resource (e.g., website) may be hosted by a large number of servers configured to process numerous user requests over time, an overwhelming amount of tracing data may be produced in the absence of weeding out requests for which tracing data is not needed. Thus, utilizing tracing criteria to selectively trace particular user requests promotes efficient troubleshooting.

20 Claims, 8 Drawing Sheets

(56) References Cited

U.S. PATENT DOCUMENTS

| | | |
|---|---|---|
| 2009/0064193 A1 | 3/2009 | Chijiiwa et al. |
| 2010/0058366 A1 | 3/2010 | Swildens |
| 2010/0205583 A1 | 8/2010 | Gebhardt et al. |
| 2011/0125892 A1* | 5/2011 | Rajan et al. .................... 709/224 |
| 2012/0198569 A1* | 8/2012 | Halas .............................. 726/30 |

OTHER PUBLICATIONS

Mytkowicz; et al., "Aligning Traces for Performance Evaluation", Published Date: Apr. 25-29, 2006, Proceedings: IPDPS '06, http://www.inf.usi.ch/faculty/hauswirth/publications/ngs06.pdf.

* cited by examiner

SERVER-SIDE TRACING OF REQUESTS

BACKGROUND

Today, large sets of servers may be configured to host various websites, web applications, and/or web services. For example, a set of servers, such as a hundred servers, may be configured to process user requests from thousands of users consuming an email web service. If an issue arises with a user attempting to access the email web service, then limited troubleshooting may be performed server-side and/or client-side. In one example, troubleshooting the issue client-side may call for the user to install tracing tools configured to trace network traffic between the client machine and a server processing user requests from the client machine, which may be burdensome to the user. In another example, tracing may be enabled server-side on all servers because it may be unknown which server may process users requests from the client machine, which may result in expensive tracing data generated for all user requests from all users. In another example, a small number of servers may be isolated from the set of servers, which may be a laborious process and/or necessitate near-real-time coordination between a troubleshooting administrator and the user. The isolated set of servers may be dedicated to processing and/or tracing user requests from the user in order to troubleshoot the issue. In this way, the tracing data may be utilized in troubleshooting and/or debugging issues.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for server-side tracing of user requests are disclosed herein. A user request, such as an HTTP request, may correspond to a request from a client machine for a web-based resource, such as a web page, a web application, a web server, data accessible from an internet source, etc. The user request may be processed by one or more servers configured to host the web-based resource (e.g., a server within a large set of servers, such as a server farm, may process the user request). An issue may arise during the processing of the user request (e.g., a user attempting to access a web page may receive a fatal error message). To enhance troubleshooting of the issue, it may be advantageous to enable server-side tracing for the particular user, while disabling server-side tracing for other user requests that are not experiencing issues.

Accordingly, server-side tracing as provided herein may be selective enabled for particular user requests based upon user requests matching tracing criteria. In particular, identifying information associated with a user request received by a server may be extracted (e.g., identifying information may be extracted from an HTTP header of an HTTP request). For example, an IP address, a user ID, user request data (e.g., a parameter within the user request such as a URL or portion thereof, a value of an HTTP header, a user agent value, information within a body of the user request, etc.), and/or other identification associated with a source that originated the user request may be extracted. The identifying information may be compared with tracing criteria to determine whether the user request is to be traced. That is, if the identifying information matches the tracing criteria, then tracing may be enabled for the user request while the server processes the user request. For example, the server may log contents of messages received over the network from a client computer that issued the user request (e.g., a set of HTTP headers and request body) and/or may log contents of messages sent from the server to the client computer (e.g., a set of HTTP response headers and/or response body) to create tracing data. If the identifying information does not match the tracing criteria, then tracing may be disabled for the user request, which may mitigate the generation of extraneous/noisy tracing data.

Tracing criteria may be created by a user, an administrator, and/or an automated process. In one example, tracing criteria may be automatically enabled based upon detecting an issue associated with processing a user request (e.g., if an error message is returned to a user attempting to upload a photo to a social network website, then tracing criteria identifying the user may be created so that future user requests from the user may be traced). In another example, a user may enable tracing through a website user interface. In another example, an administrator, such as a help desk operator, may enable tracing for a user during a troubleshooting session with the user. In this way, user requests matching tracing criteria may be traced to generate tracing data, which may be used to troubleshoot/debug issues.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many users may experience issues when interacting with web-based resources, such as web pages, web services, and/or web applications. When an issue arises between a user on a client machine and a set of servers hosting the web-based resource, troubleshooting may be performed. Troubleshooting the issue client-side may call for the user to install tracing tools on the client machine. The tracing tools may generate tracing data comprising a client-side perspective of web traffic data that may be analyzed by an administrator of the set of servers (e.g., or someone else) to resolve the issue. Troubleshooting the issue server-side may involve enabling tracing on all servers within the set of servers because the exact server upon which to enable tracing may be unknown (e.g., it may be unpredictable as to which server may process a given user request). Enabling tracing on all servers may result in expensive tracing data for all requests. Such tracing data may comprise a significant amount of noise (e.g., tracing data associated with users that are not participating in troubleshooting and/or may not be experiencing issues). Attempts to isolate a set of servers for processing a particular user request may result in a laborious process that may involve near-real-time coordination between the user and the administrator.

Accordingly, one or more systems and/or techniques for server-side tracing of user requests are provided herein. In one example, a set of servers (e.g., thousands of servers) may be configured to process user requests for a web-based resource, such as a web page. Tracing may generally be enabled for respective servers within the set of servers. However, instead of tracing data for all user requests, user requests may be selectively traced. That is, merely user requests matching tracing criteria may be traced, while user requests not matching tracing criteria may be processed without tracing. Tracing criteria may specify various criteria that may be met before a user request is traced, such as whether identifying information within the user request matches a user ID, an IP address, and/or other identifying information. If the identifying information matches the tracing criteria, then tracing data, such as internal server processing data and/or a server-side perspective of web traffic data may be generated (e.g., contents of messages received and/or sent by the server may be logged to create tracing data). The tracing data may be published to a centralized output share and/or may be made available for troubleshooting/debugging. The tracing data may be aggregated with other published tracing data associated with the tracing criteria to create aggregated tracing data. In this way, the aggregated tracing data may be utilized for troubleshooting an issue associated with a user and/or a client machine identified by the tracing criteria. It may be appreciated that zero or more tracing data may be aggregated. In one example, various tracing data may be aggregated together to create aggregated tracing data (e.g., an administrator and/or tracing analysis tool may evaluate the aggregated tracing data). In another example, various tracing data may be published to a centralized output share, such as a log file, without being aggregated (e.g., an administrator and/or trace analysis tool may individually evaluate the various non-aggregated tracing data). In another example, a statistics trace may be performed by a tracing component (e.g., the statistics trace may comprise aggregated statistics about user requests matching tracing criteria). For example, a tracing component may create a statistics trace comprising information associated with upload user requests (e.g., the tracing component may collect aggregated counts of user request outcomes, such as success, timeout, quota exceeded, access denied, etc., and may group such information under various identifying information such as by origin (e.g., browser, mobile phone, desktop, etc.)).

Figure 1:
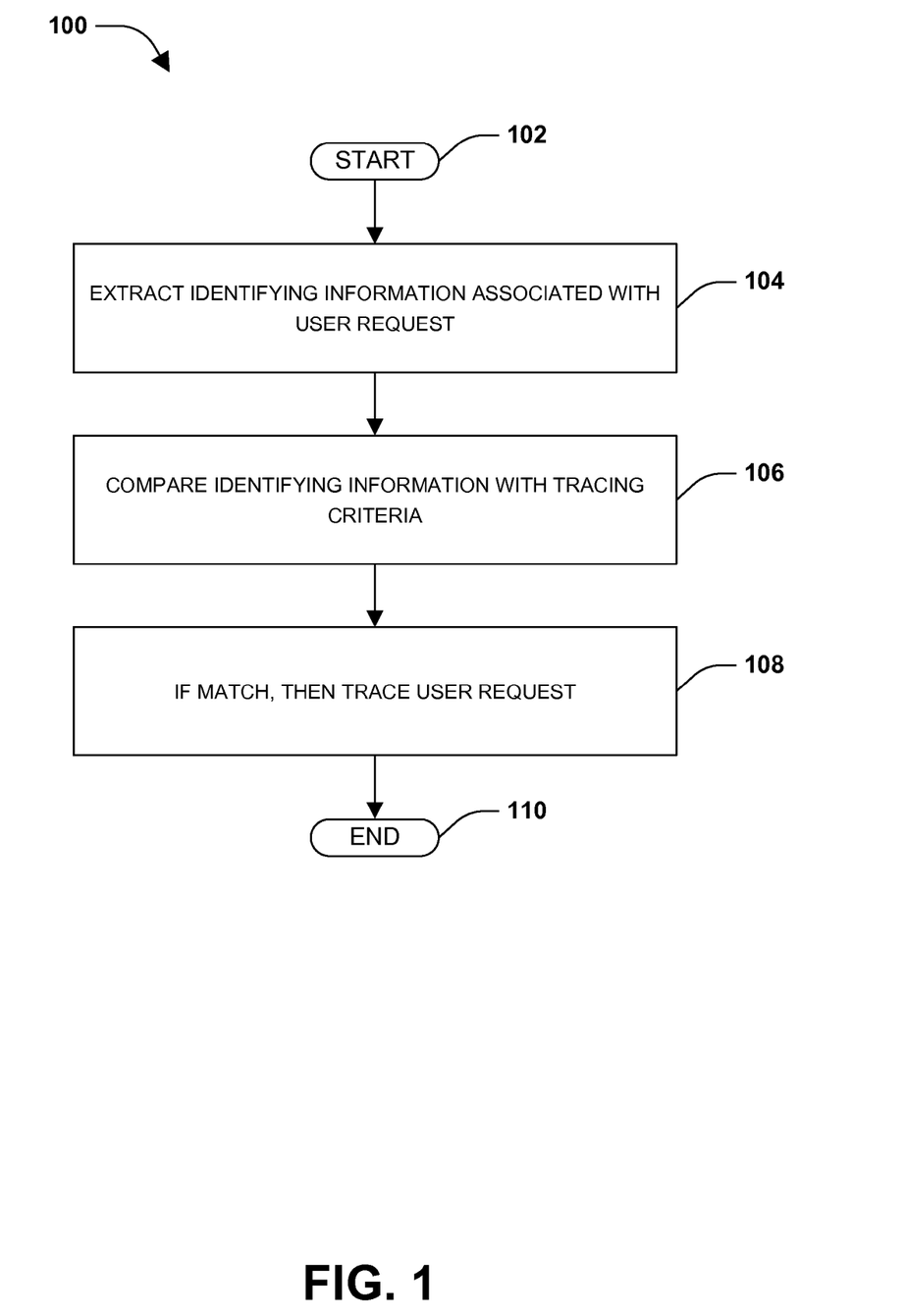
FIG. 1 is a flow chart illustrating an exemplary method of server-side tracing of user requests.

One embodiment of server-side tracing of user requests is illustrated by an exemplary method 100 in FIG. 1. At 102, the method starts. At 104, identifying information associated with a user request received by a server may be extracted. The user request may have been submitted by a client machine to the server, and may be associated with a web-based resource, such as a web page and/or web service, hosted by the server (e.g., a user may submit an HTTP user request to a social network website to upload a photo). The identifying information may comprise an IP address of a client machine, a user ID, and/or a variety of other identification data that may be associated with the user request. In one example, the server may extract the identifying information from the user request, and may provide the identifying information to a tracing component that may determine whether the user request is to be traced during server processing based upon comparing the identifying information with tracing criteria.

At 106, the identifying information may be compared with tracing criteria to determine whether the user request is to be traced. It may be appreciated that identifying information within user requests may be compared with tracing criteria in order to selectively determine which user requests to trace and which user request to not trace, which may mitigate the generation of irrelevant/noisy tracing data that may not be pertinent to troubleshooting and/or debugging particular user requests. The tracing criteria may comprise identification information, such as an IP address and/or user ID (e.g., the tracing criteria may identify a user and/or client computer that may be experiencing issues and/or may be undergoing troubleshooting with regard to accessing a web-based resource hosted by the server). In one example, the tracing criteria may be created based upon a tracing request received from a client computer (e.g., a user may experience an issue accessing the web-based resource using a browser, and thus may enable tracing through a tracing user interface provided through the browser). In another example, the tracing criteria may be automatically created based upon detecting an issue associated with a user request received from a client computer. In another example, the tracing criteria may be created by an administrator attempting to troubleshoot an issue for the user.

At 108, if the identifying information matches the tracing criteria, then the user request may be traced during processing of the user request by the server to generate tracing data. The tracing data may comprise internal server processing data, such as server event data, server error messages, and/or a variety of data associated with the server processing the user request. The tracing data may comprise a server-side perspective of web traffic data sent/received by the server, such as an HTTP request, an HTTP response, an error message, data associated with a requested web-based resource, and/or a variety of other information associated with web traffic data. If the identifying information does not match the tracing criteria, then the user request may be refrained from being traced, which may mitigate generating extraneous tracing data for users that may not be experiencing issues.

If tracing data is generated, then the tracing data may be published to a centralized output share (e.g., a central repository where various servers may upload tracing data). The tracing data may be aggregated with other tracing data (e.g., tracing data published to the centralized output share by other servers) associated with the tracing criteria to create aggregated tracing data. For example, tracing criteria may comprise user ID=Dan. A first user request processed by a first server may be traced to create first tracing data based upon the first user request being associated with the user ID=Dan. A second user request processed by a second server may be traced to create second tracing data based upon the second user request being associated with the user ID=Dan. The first tracing data and/or the second tracing data may be uploaded to the centralized output share, and may be aggregated together to create aggregated tracing data.

The tracing data (e.g., tracing data and/or aggregated tracing data) may be outputted in a format readable by a trace analysis tool. The trace analysis tool may be pre-configured to generate and/or analyze tracing data in real-time (e.g., client-side tracing of real-time data generated at a client computer). The trace analysis tool may be utilized for analyzing the tracing data (e.g., the tracing data traced server-side) by formatting the tracing data as an emulation of real-time captured tracing data, which may be readable by the trace analysis tool. The formatted tracing data may be inputted into the trace analysis tool in real-time. In this way, trace analysis data may be generated, which may be used to troubleshoot an issue associated with the user request. At 110, the method ends.

Figure 2:
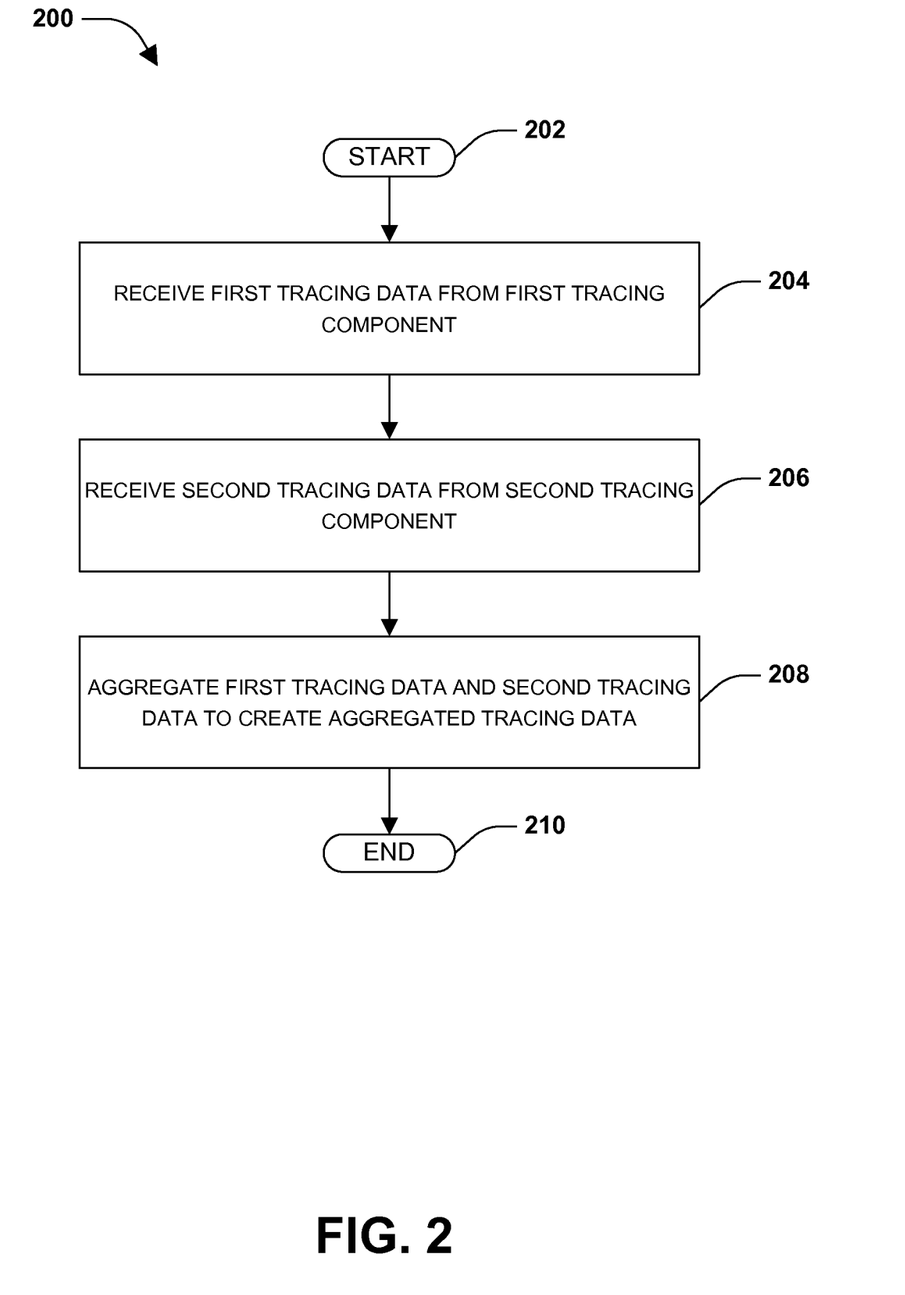
FIG. 2 is a flow chart illustrating an exemplary method of server-side tracing of user requests.

One embodiment of server-side tracing of user requests is illustrated by an exemplary method 200 in FIG. 2. At 202, the method starts. At 204, first tracing data from a first tracing component on a first server may be received. The first tracing data may correspond to internal server processing data and/or web traffic data, etc. associated with a first user request matching tracing criteria (e.g., the first user request may have comprised IP Address 198.168.66.77 identifying information that matched IP Address 198.168.66.77 tracing criteria, and thus tracing may have been enabled for the first user request). At 206, second tracing data from a second tracing component on a second server may be received. The second tracing data may correspond to internal server processing data and/or web traffic data, etc. associated with a second user request matching the tracing criteria (e.g., the second user request may have comprised IP Address 198.168.66.77 identifying information that matched IP Address 198.168.66.77 tracing criteria, and thus tracing may have been enabled for the second user request).

At 208, the first tracing data and the second tracing data may be aggregated to create aggregated tracing data associated with the tracing criteria. The aggregated tracing data may be formatted as an emulation of real-time captured tracing data (e.g., the aggregated tracing data may be formatted, such that the formatted aggregated tracing data may appear to comprise real-time tracing data from a client machine from the viewpoint of a trace analysis tool consuming the formatted aggregated tracing data). The formatted aggregated tracing data may be inputted into a trace analysis tool in real time to create trace analysis data (e.g., a chart, statistics, raw tracing data, and/or other troubleshooting/debugging data associated with the first and second user requests). The trace analysis data may be provided within an email, a log file, a user interface accessible to an administrator of the first and/or second server, and/or a web user interface accessible to a client computer originating the first user request and/or the second user request. In this way, the trace analysis data (e.g., derived from server-side tracing data) may be used to troubleshoot issues of a user and/or a client computer originating the first and/or second user request. At 210, the method ends.

Figure 3:
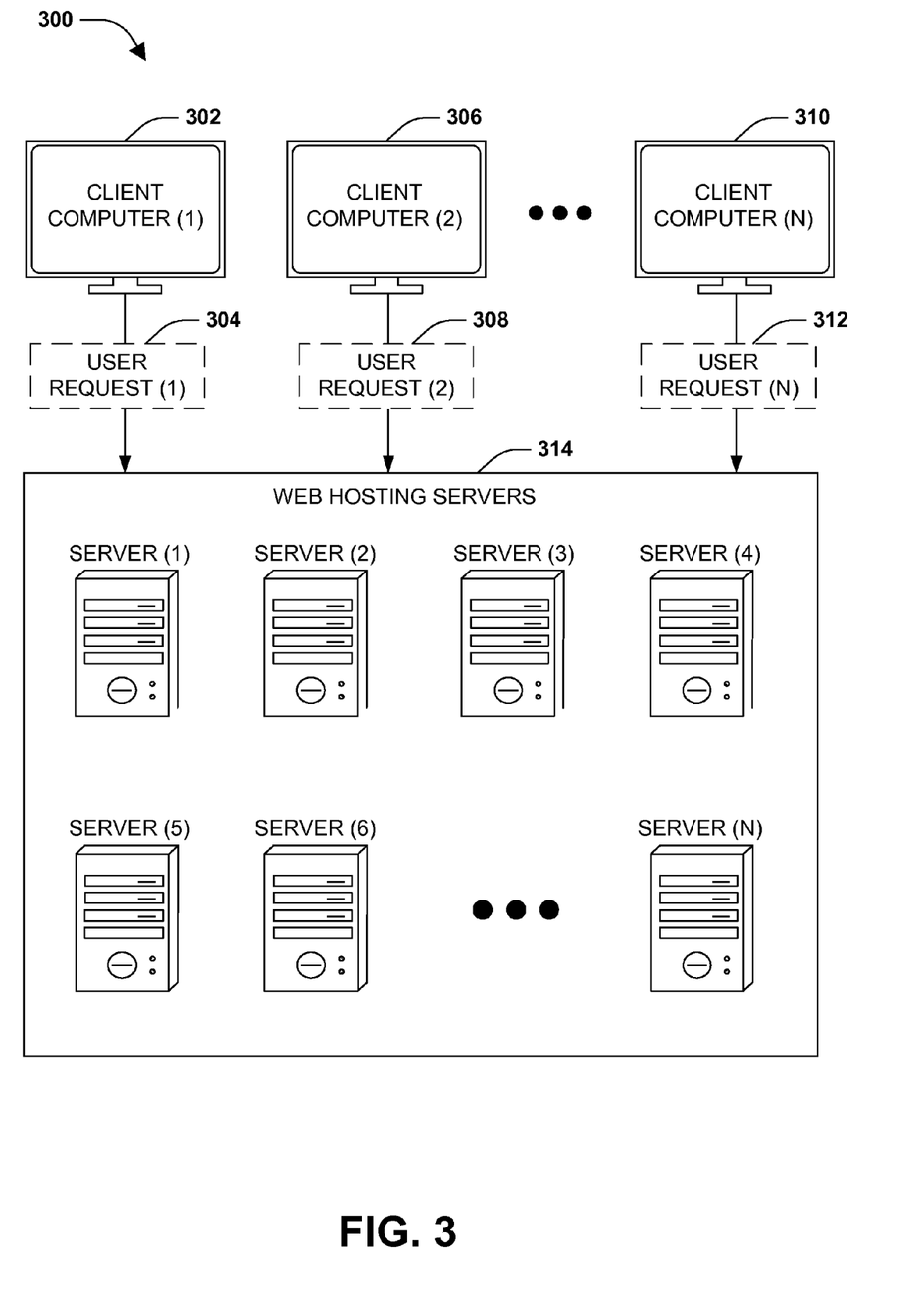
FIG. 3 is an illustration of an example of a set of web hosting servers configured to process user requests for a web-based resource.

FIG. 3 illustrates an example 300 of a set of web hosting servers 314 configured to process user requests for a web-based resource. The set of web hosting servers 314 may comprise one or more servers (e.g., server (1) through server (N)) configured to host a web-based resource, such as a web application, a web page, and/or a web service, for example. Such servers may be configured to process user requests from client computers (e.g., a user may submit a user request to access weather information provided by a web service hosted by the set of web hosting servers 314). Because the set of web hosting servers 314 may comprise a significant number of servers, it may be difficult to predict which server may process a particular user request. For example, server (2) may process user request (1) 304 from client computer (1) 302, while server (6) may process user request (2) 308 from client computer (2) 306 and server (1) may process user request (N) 312 from client computer (N) 310. Moreover, subsequent requests from client computers may be processed by different servers (e.g., a second request from client computer (1) 302 may not be processed by server (2), a second request from client computer (2) 306 may not be processed by server (6), a second request from client computer (N) 310 may not be processed by server (1), etc.) Because the exact server that may process a user request from a client computer may be unknown, conventional server-side tracing techniques may enable tracing on all the servers within the set of web hosting servers 314. Enabling such comprehensive tracing (e.g., tracing all user requests processed by all servers) may result in an overwhelming amount of tracing data that may be difficult to sift through to find tracing data associated with a single user undergoing troubleshooting. Accordingly, it may be advantageous to specify tracing criteria that may be matched to user requests in order to determine which user request to trace. In this way, merely tracing data relevant to particular users and/or client machines may be collected and/or used for troubleshooting.

Figure 4:
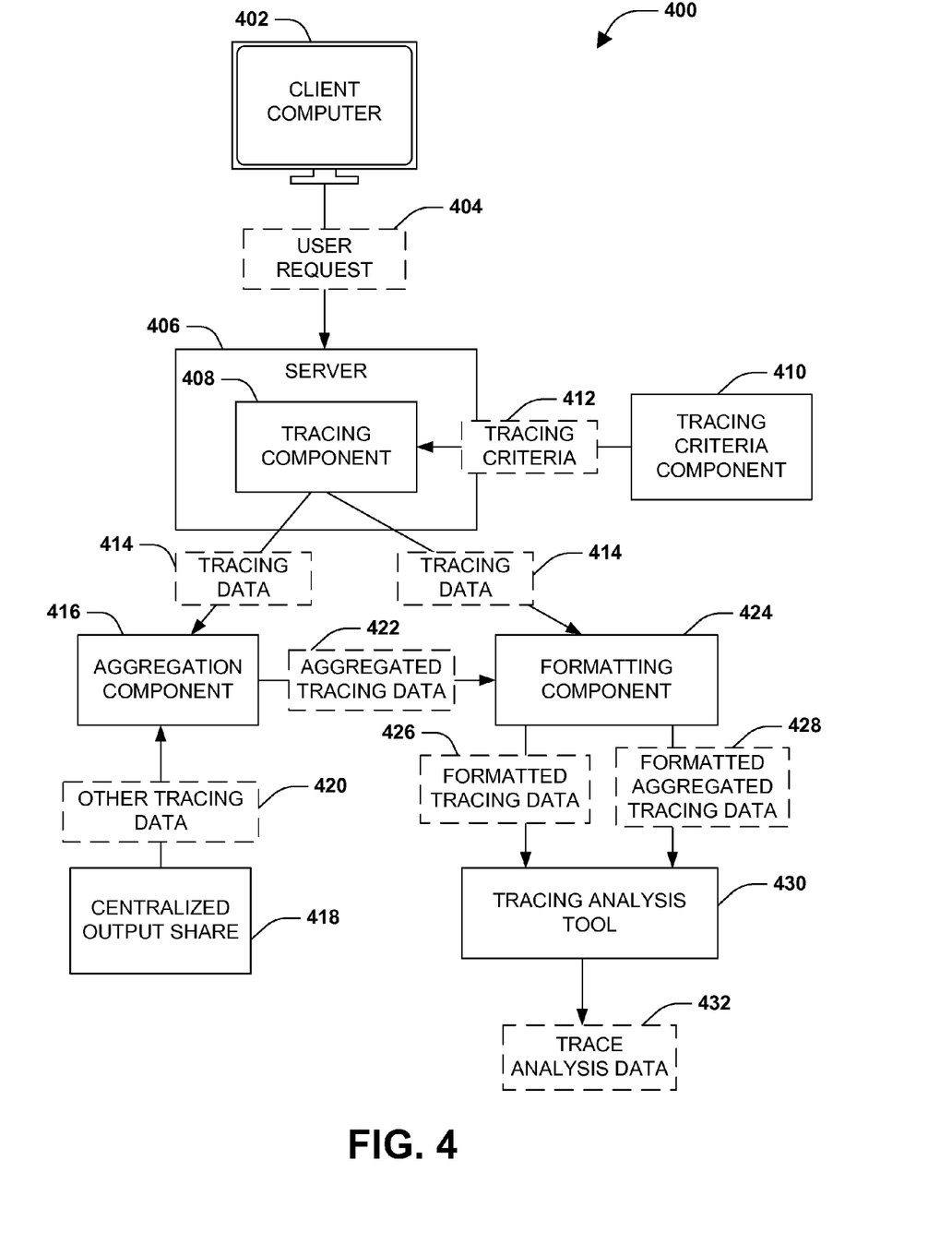
FIG. 4 is a component block diagram illustrating an exemplary system for server-side tracing of user requests.

FIG. 4 illustrates an example of a system 400 configured for server-side tracing of user requests. The system 400 may comprise a tracing component 408, a tracing criteria component 410, an aggregation component 416, and/or a formatting component 424. The tracing component 408 may be configured to extract identifying information associated with a user request 404 received by a server 406 from a client computer 402. For example, the tracing component 408 may extract user ID=Dan from an HTTP header associated with the user request 404. The tracing component 408 may be configured to compare the identifying information with tracing criteria 412 to determine whether the user request 404 is to be traced. The tracing criteria component 410 may be configured to maintain various tracing criteria used by the tracing component 408 and/or other tracing components on other servers not illustrated. In one example, the tracing criteria component 410 may automatically create tracing criteria based upon detecting an issue associated with a user request received from the client computer (e.g., page unavailable). For example, the tracing criteria may correspond to the client computer, a user, the issue detected, and/or other information. In another example, the tracing criteria component 410 may create tracing criteria based upon a tracing request from a user and/or an administrator (e.g., user Dan may submit a tracing request to the tracing criteria component 410 through a web page user interface to enable tracing for user requests issued by Dan to the server 406).

If the identifying information extracted from the user request 404 matches the tracing criteria 412 (e.g., the tracing criteria specifies that user requests from user ID=Dan are to be traced), then the user request 404 may be traced during processing of the user request 404 by the server 406 to generate tracing data 414. If the identifying information does not match the tracing criteria 412, then the user request 404 may be processed by the server 406 without tracing (e.g., activities of the particular user are not problematic and thus no tracing is desired). In one example where tracing data is created, the tracing data 414 may be provided to the aggregation component 416 and/or may be published to a centralized output share 418. The aggregation component 416 may be configured to aggregate the tracing data 414 with other tracing data 420 associated with the tracing criteria 412 (e.g., other tracing data that may have been published to the centralized output share 418 by the tracing component 408 on server 406 and/or other tracing data that may have been published by other instances of the tracing component on other servers not illustrated). In this way, aggregated tracing data 422 may be created.

The formatting component 424 may be configured to format the tracing data 414 and/or the aggregated tracing data 422. In one example, the formatting component 424 may output the tracing data 414 in a format readable by a tracing analysis tool 430 such as formatted tracing data 426. The format may comprise an emulation of real-time captured tracing data (e.g., the formatted tracing data 426 may be formatted so that it may appear to the tracing analysis tool 430 as though the formatted tracing data 416 is being collected in real-time at the client computer 402). In another example, the formatting component 424 may output the aggregated tracing data 422 in the format readable by the tracing analysis tool 430 such as formatted aggregated tracing data 428. Trace analysis data 432 may be received from the trace analysis tool 430 based upon the tracing analysis tool 430 analyzing the formatted tracing data 426 and/or the formatted aggregated tracing data 428. The trace analysis data 432 may comprise statistical data, graphs, raw data, and/or a variety of other information associated with tracing data derived from user requests matching the tracing criteria 412. The trace analysis data 432 may be utilized in troubleshooting/debugging issues arising between the client computer 402 and the server 406 (e.g., internal server processing failures and/or network traffic failures that may have occurred during processing of the user request 404 by the server 406).

Figure 5:
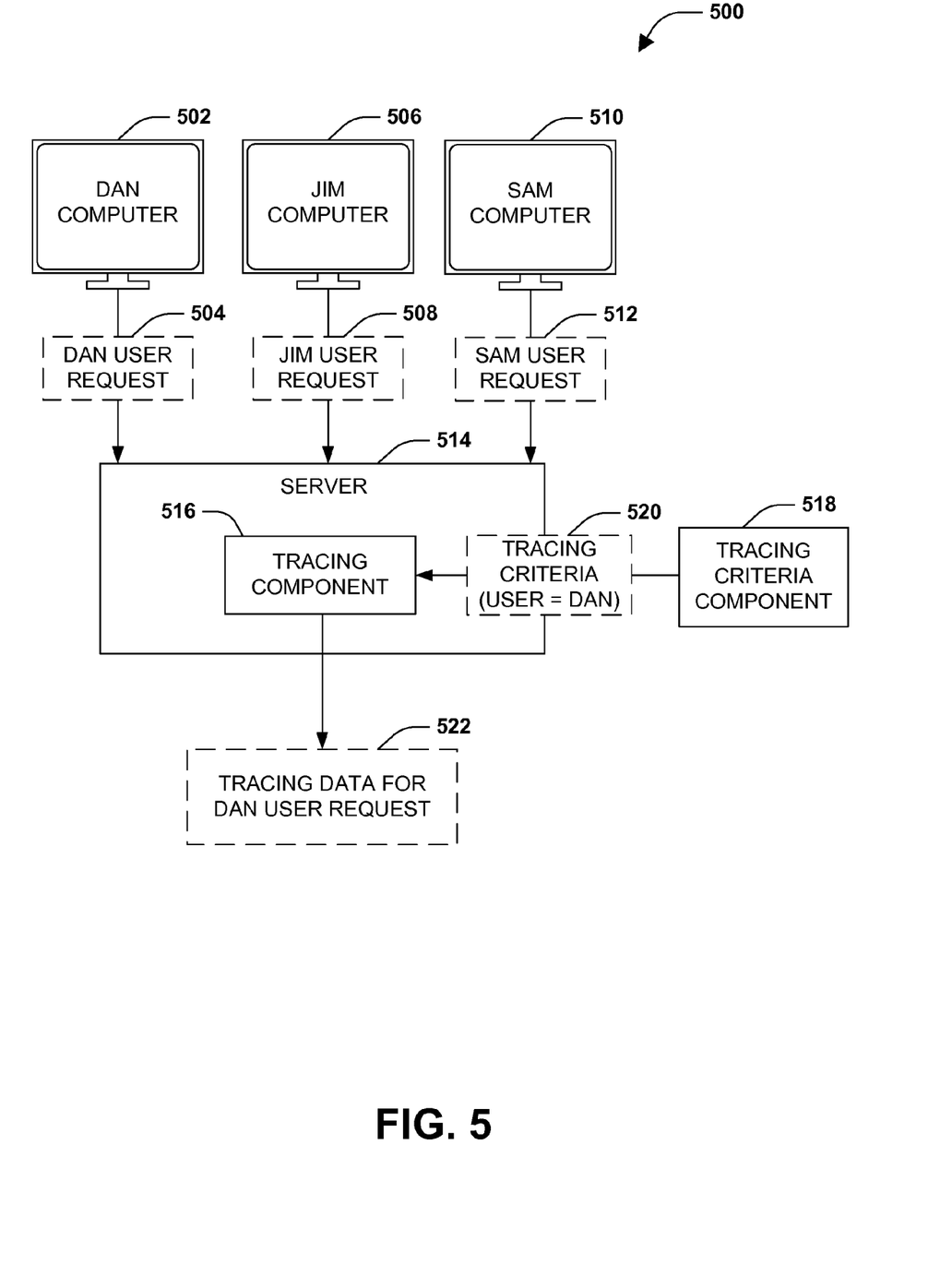
FIG. 5 is an illustration of an example of a tracing component tracing a user request.

FIG. 5 illustrates an example 500 of a tracing component 516 tracing a user request. A server 514 may be associated with a set of servers configured to host a web-based resource, such as a social network website. The set of servers may process user requests associated with the social network website (e.g., respective servers may allow users to upload photos, send messages, and/or perform other actions associated with the social network website). The tracing component 516 may be configured to determine whether user requests received by the server 514 are to be traced or not based upon various tracing criteria maintained by a tracing criteria component 518 (e.g., the tracing criteria component 518 may be configured to add, remove, update, and/or make tracing criteria available to the set of servers). For example, the tracing criteria component 518 may make available a tracing criteria user ID=Dan 520 (e.g., Dan computer 502 may be experiencing issues and/or may be undergoing troubleshooting with regard to the social network website). It may be appreciated that other tracing criteria, not illustrated, may be made available (e.g., tracing criteria IP Address=196.128.5.32; tracing criteria user ID=Peter; etc.). In this way, the tracing component 516 may enable tracing for user requests meeting the tracing criteria user ID=Dan 520 and/or other tracing criteria not illustrated (e.g., but not for requests not meeting the tracing criteria).

In one example, the server 514 may receive a Dan user request 504 from Dan computer 502. The tracing component 516 may extract identifying information associated with the Dan user request 504. For example, the server 514 may notify the tracing component 516 that user ID=Dan identifying information is specified within an HTTP header of the Dan user request 504. The tracing component 516 may determine that the user ID=Dan identifying information matches (at least some of) the tracing criteria user ID=Dan 520. Based upon the match, the tracing component 516 may enable tracing for the Dan user request 504 while the server 514 processes the Dan user request 504. In this way, tracing data for the Dan user request 522 may be generated. The tracing data for the Dan user request 522 may be made available for troubleshooting issues arising from the Dan computer 502 attempting to access the social network website.

The server 514 may receive a Jim user request 508 from Jim computer 506. The tracing component 516 may extract identifying information from the Jim user request 508. For example, the server 514 may notify the tracing component 516 that IP Address=192.168.77.66 identifying information is specified within an HTTP header of the Jim user request 508. The tracing component 516 may determined that the IP Address=192.168.77.66 identifying information does not match tracing criteria provided by the tracing criteria component 518 (e.g., Jim computer 506 may not be experiencing issues and/or may be not undergoing troubleshooting with regard to the social network website, and thus no tracing criteria may have been made for Jim computer 506). Accordingly, the tracing component 516 may not enable tracing for the Jim user request 508 while the server 514 processes the Jim user request 508.

The server 514 may receive a Sam user request 512 from Sam computer 510. The tracing component 516 may extract identifying information from the Sam user request 512. For example, the server 514 may notify the tracing component 516 that User ID=Sam identifying information was specified within the Sam user request 512. The tracing component 516 may determine that the User ID=Sam identifying information does not match tracing criteria provided by the tracing criteria component 518 (e.g., the Sam computer 510 may not be experiencing issues and/or may not be undergoing troubleshooting with regard to the social network website, and thus no tracing criteria may have been created for Sam computer 510). Accordingly, the tracing component 516 may not enable tracing for the Sam user request 512 while the server 514 processes the Sam user request 512.

Figure 6:
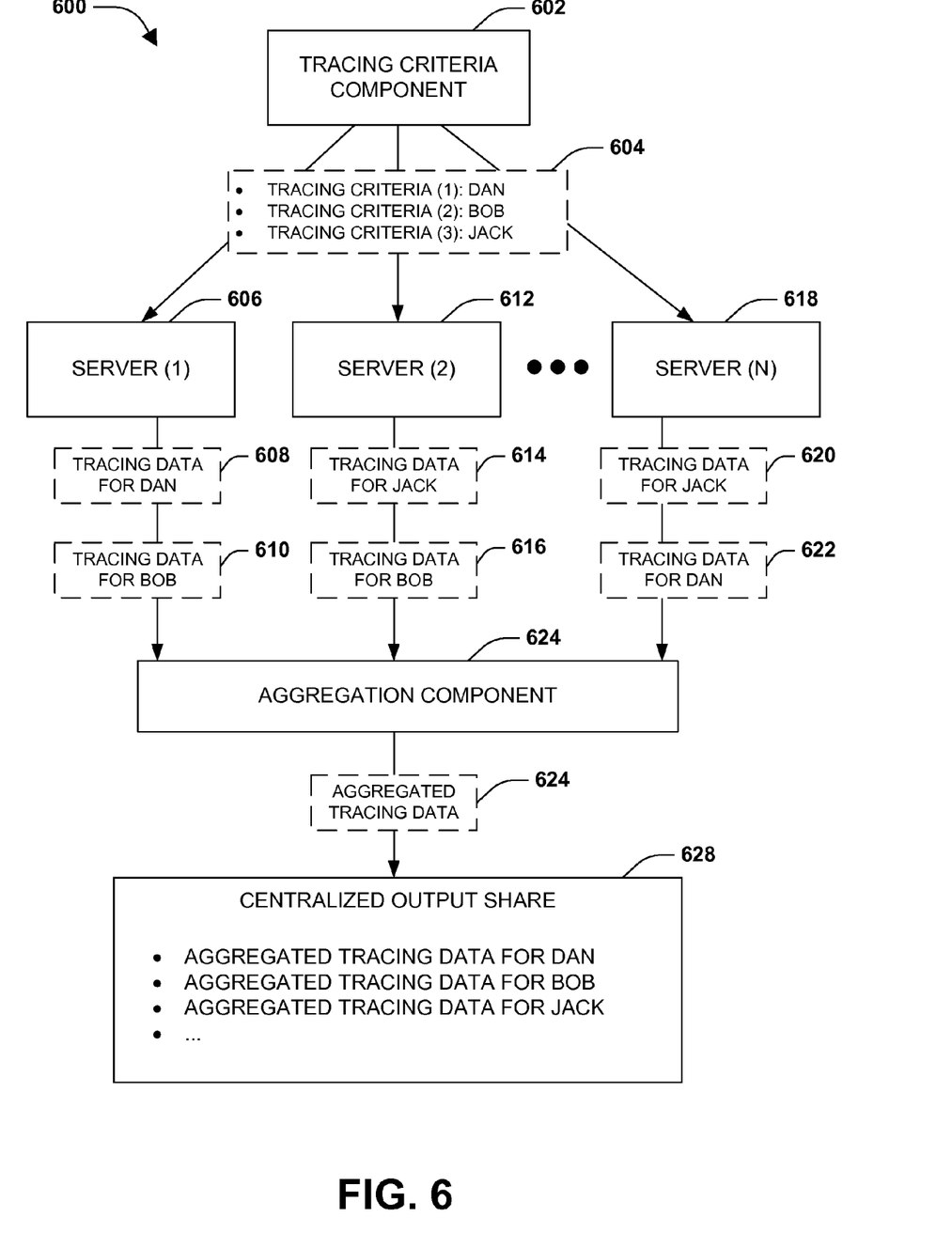
FIG. 6 is an illustration of an example of a tracing criteria component maintaining tracing criteria.

FIG. 6 illustrates an example 600 of a tracing criteria component 602 maintaining tracing criteria 604. The tracing criteria component 602 may maintain tracing criteria 604, such as a first tracing criteria (user ID=Dan), a second tracing criteria (user ID=Bob), and a third tracing criteria (user ID=Jack). In one example, a user Dan may have submitted a tracing request through a website user interface to enable tracing after receiving errors when attempting to upload photos to a social network website hosted by a set of servers (e.g., server (1) 606, server (2) 612, and/or server (N) 618) associated with the tracing criteria component 602). In another example, user Bob may have initiated a troubleshooting session with an administrator after receiving errors when attempting to send a message through the social network website, and thus the administrator may have submitted a tracing request to the tracing criteria component 602 on behalf of Bob to create the second tracing criteria (User ID=Bob). In another example, a connection issue between Jack and the social network website may have been detected, and thus the tracing criteria component 602 may have automatically created the third tracing criteria (User ID=Jack).

Instances of a tracing component associated with server (1) 606, server (2) 612, server (N) 618, etc. may be configured to enable tracing for user requests matching the first tracing criteria (user ID=Dan), the second tracing criteria (user ID=Bob), the third tracing criteria (user ID=Jack), and/or other tracing criteria not illustrated. For example, a first tracing component on server (1) 606 may generate tracing data for Dan 608 while server (1) 606 processes a user request associated with User ID=Dan. The first tracing component on server (1) 606 may generate tracing data for Bob 610 while server (1) 606 processes a user request associated with User ID=Bob. A second tracing component on server (2) 612 may generate tracing data for Jack 614 while server (2) 612 processes a user request associated with User ID=Jack. The second tracing component on server (2) 612 may generate tracing data for Bob 616 while server (2) 612 processes a user request associated with User ID=Bob. A third tracing component on server (N) 618 may generate tracing data for Jack 620 while server (N) 618 processes a user request associated with User ID=Jack. The third tracing component on server (N) 618 may generate tracing data for Dan 622 while server (N) 618 processes a user request associated with User ID=Dan. The tracing components may publish tracing data to a centralized output share 628.

An aggregation component 624 may be configured to aggregate tracing data that is and/or is to be published to the centralized output share 628. For example, the aggregation component 624 may aggregate the tracing data for Dan 608, the tracing data for Dan 622, and/or other tracing data for Dan published to the centralized output share 628. The aggregation component 624 may aggregate the tracing data for Bob 610, the tracing data for Bob 616, and/or other tracing data for Bob published to the centralized output share 628. The aggregation component 624 may aggregate the tracing data for Jack 614, the tracing data for Jack 620 and/or other tracing data for Jack published to the centralized output share 628. In this way, the aggregation component 624 may create aggregated tracing data 626, which may be stored within the centralized output share 628.

Figure 7:
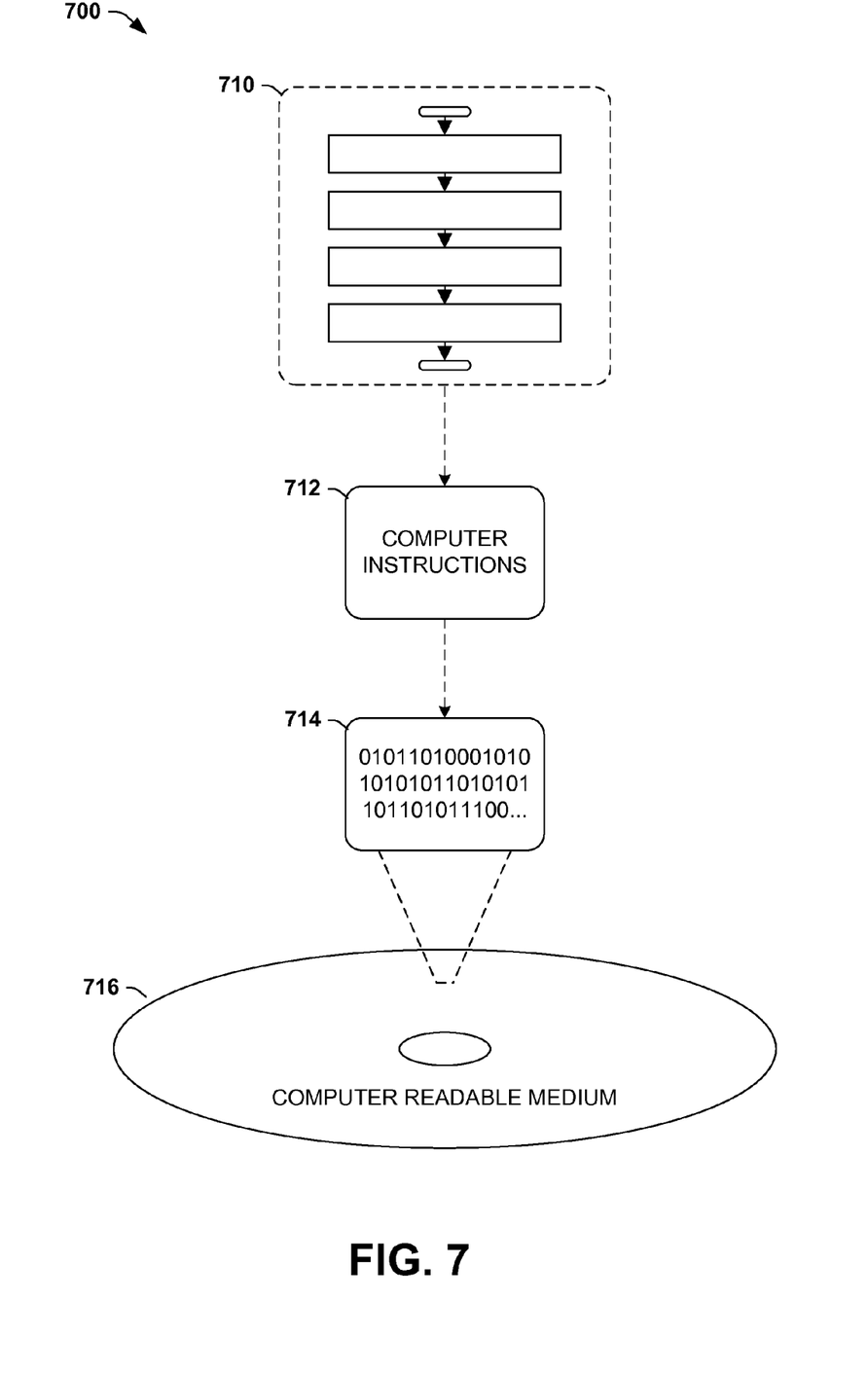
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as at least some of the exemplary method 100 of FIG. 1 and/or at least some of exemplary method 200 of FIG. 2, for example. In another such embodiment, the processor-executable instructions 712 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
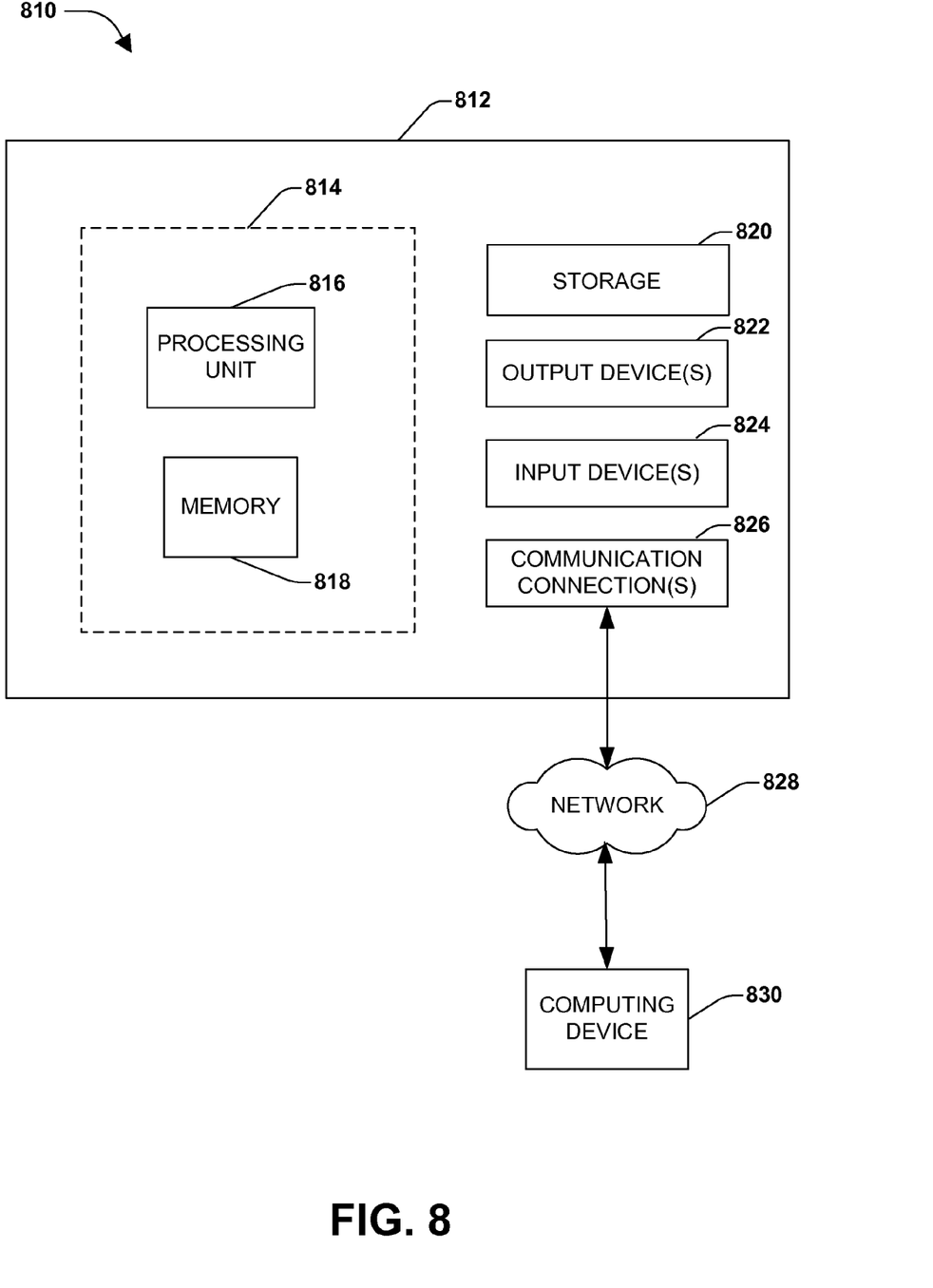
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   extracting identifying information associated with a user request received by a server, the identifying information comprising at least one of:
      information identifying a user associated with the user request; or
      information identifying a client computer associated with the user request;
   comparing the identifying information with tracing criteria to determine whether the user request is to be traced; and
   if the identifying information matches the tracing criteria, then tracing the user request during processing of the user request by the server to generate tracing data.

2. The method of claim 1, comprising:
if the identifying information does not match the tracing criteria, then refraining from tracing the user request.

3. The method of claim 1, wherein the user request corresponds to at least one of a web service request or a web page request.

4. The method of claim 1, wherein the identifying information comprises at least one of an IP address associated with the client computer or a user ID associated with the user.

5. The method of claim 1, wherein tracing the user request comprises:
tracking internal server processing data associated with the user request.

6. The method of claim 1, comprising:
detecting an issue associated with the user request received from the client computer; and
automatically creating the tracing criteria based upon the issue.

7. The method of claim 1, comprising:
receiving a tracing request from the client computer; and
creating the tracing criteria based upon the tracing request.

8. The method of claim 1, comprising:
publishing the tracing data to a centralized output share; and
aggregating the tracing data with other tracing data published to the centralized output share to create aggregated tracing data, the other tracing data associated with the tracing criteria.

9. The method of claim 1, comprising:
outputting the tracing data in a format readable by a trace analysis tool.

10. The method of claim 9, wherein outputting the tracing data comprises:
formatting the tracing data as an emulation of real-time captured tracing data to generate formatted tracing data.

11. The method of claim 10, comprising:
inputting the formatted tracing data into the trace analysis tool in real-time.

12. The method of claim 1, wherein extracting the identifying information comprises:
extracting the identifying information from HTTP data received by the server.

13. A system, comprising:
one or more processing units; and
memory comprising instructions that when executed by at least one of the one or more processing units, perform operations comprising:
extracting identifying information associated with a user request received by a server, the identifying information comprising at least one of:
information identifying a user associated with the user request; or
information identifying a client computer associated with the user request;
comparing the identifying information with tracing criteria to determine whether the user request is to be traced; and
if the identifying information matches the tracing criteria, then tracing the user request during processing of the user request by the server to generate tracing data.

14. The system of claim 13, wherein the operations further comprise:
aggregating the tracing data with other tracing data published to a centralized output share to create aggregated tracing data, the other tracing data associated with the tracing criteria.

15. The system of claim 13, wherein the operations further comprise:
outputting the tracing data in a format readable by a tracing analysis tool.

16. The system of claim 13, wherein the operations further comprise:
detecting an issue associated with the user request received from the client computer; and
automatically creating the tracing criteria based upon the issue.

17. The system of claim 14, wherein the operations further comprise:
outputting the aggregated tracing data in a format readable by a tracing analysis tool.

18. A computer readable device comprising processor-executable instructions that when executed perform operations, the operations comprising:
extract identifying information associated with a user request received by a server, the identifying information comprising at least one of:
information identifying a user associated with the user request; or
information identifying a client computer associated with the user request;
compare the identifying information with tracing criteria to determine whether the user request is to be traced; and
if the identifying information matches the tracing criteria, then trace the user request during processing of the user request by the server to generate tracing data.

19. The computer readable device of claim 18, wherein the identifying information comprises at least one of an IP address associated with the client computer or a user ID associated with the user.

20. The computer readable device of claim 18, wherein the operations further comprise:
detect an error loading content at the client computer responsive to a second user request; and
create the tracing criteria responsive to detection of the error.

* * * * *